Patented Oct. 23, 1928.

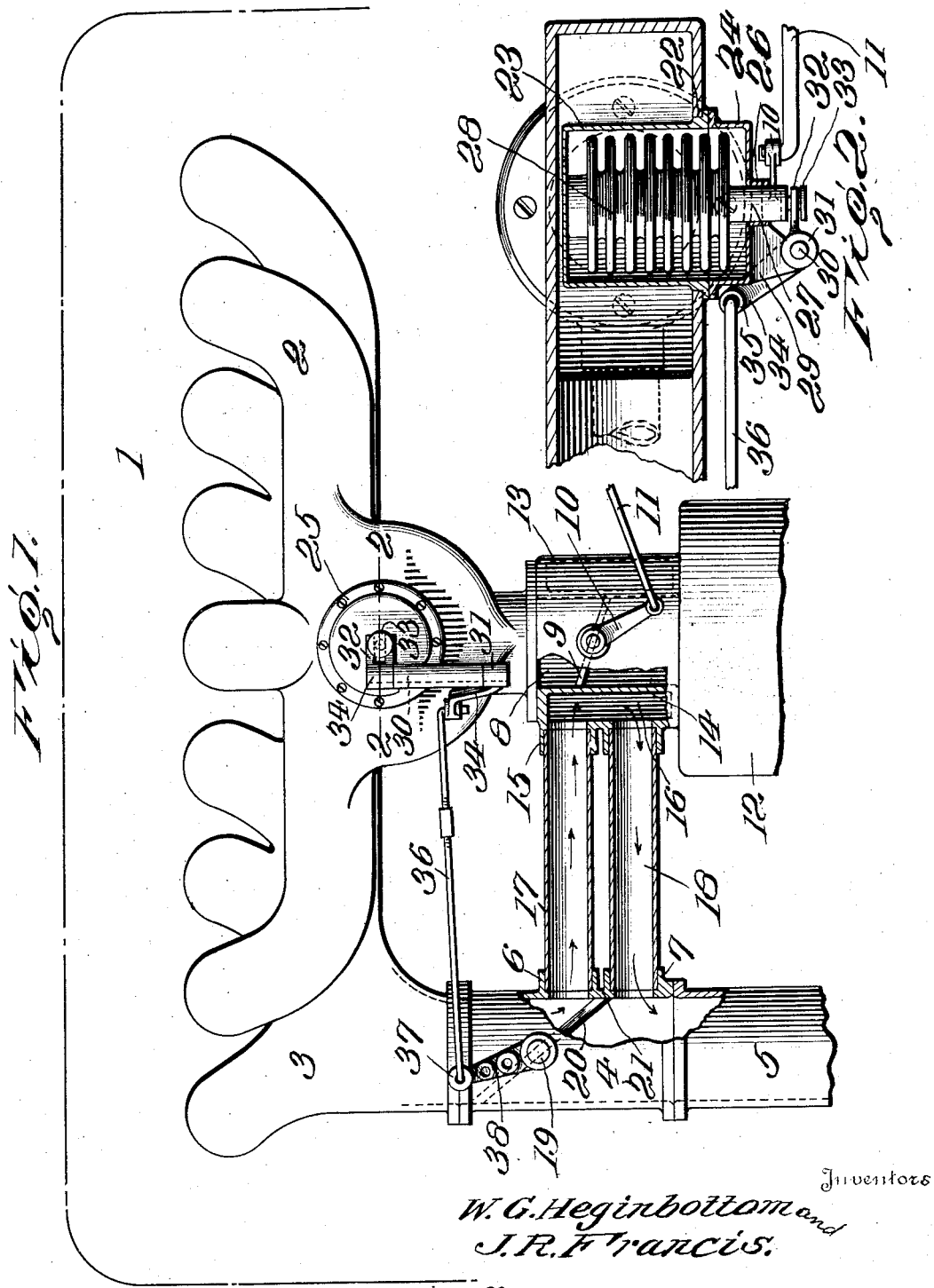

1,688,387

UNITED STATES PATENT OFFICE.

WALTER G. HEGINBOTTOM AND JACOB RICHARD FRANCIS, OF FLINT, MICHIGAN.

THERMOSTATIC HEAT CONTROL FOR INTERNAL-COMBUSTION ENGINES.

Application filed September 17, 1920. Serial No. 411,009.

This invention relates to certain new and useful improvements in thermostatic heat control for internal combustion engines, the object being to provide means for controlling the application of heat to the charge in its passage to the internal combustion engine.

Another object of our invention is to provide a heat control wherein a carbureting passage is surrounded by a heating jacket in communication with the exhaust line pipe, the admission of the heating medium being controlled by a valve located in the exhaust line and operated by a thermostat located in the carbureting passage or induction pipe leading to the engine.

A still further object of the invention is to provide a construction which is very simple and one which can be readily installed on any of the well known forms of internal combustion engies now in use so as to automatically regulate the temperature of the explosive charge in its passage to the engine.

Other and further objects and advantages of the invention will be hereinafter set forth and the novel features defined by the appended claim.

In the drawings,

Figure 1 is a side view of a portion of an internal combustion engine showing the application of our improved construction of heat control which is partly in section; and Figure 2 is a section taken on line 2—2 of Figure 1.

In the drawing 1 indicates an internal combustion engine, 2 the intake manifold and 3 the exhaust maifold, the above description being given so that the operation of our improved construction of thermostatic heat control can be readily understood.

In carrying out our invention we secure to the exhaust manifold 3 a valve casing 4 which has connected thereto an exhaust pipe 5 leading to the ordinary muffler now employed in connection with internal combustion engines. The valve casing 4 is provided with nipples 6 and 7 forming inlets and outlets for the exhaust gases as will be hereinafter fully described.

Connected to the lower end of the intake manifold 2 of the internal combustion engine is the upper end of a carbureting passage 8 in which is mounted a throttle valve 9 provided with a lever 10 having an operating rod 11 connected thereto by means of which the throttle can be controlled in the usual way. The carbureting passage 8 is herein shown in the form of a throttle chamber of the carbureter 12 but it is of course understood that we do not wish to limit ourselves to the use of any particular construction of charge forming device or induction pipe as we consider the carbureting passage to be that portion of the induction pipe, manifold or other termed passage that extends from the point of delivery of fuel in the charge forming device to the intake valves of the internal combustion engine and to accomplish our results it is only necessary to have a heater arranged to heat the charge in its passage to the internal combustion engine which is controlled by a thermostat disposed in the path of travel of said charge through the medium of a valve disposed in the exhaust line pipe which in turn controls the admission of the heating medium to the heater and therefore we reserve the right to place the heater around the charge forming device, induction pipe or manifold.

In the embodiment of the invention as herein shown the carbureting passage is surrounded by a casing 13 forming a heating chamber 14 which is provided with inlet and outlet nipples 15 and 16 which are connected to the inlet and outlet nipples 6 and 7 by pipes 17 and 18 by means of which the exhaust gases can be diverted from the valve casing 4 so as to pass through the heating chamber 14 in order to heat the charge in its passage to the internal combustion engine.

In this form the throttle chamber of the carbureting passage is surrounded by a heating jacket but it is of course understood that the induction pipe leading from a carbureter can be provided with a heating jacket having a heating chamber in communication with the exhaust line pipe in order to accomplish the same result without departing from the spirit of our invention. We are also aware that instead of employing two pipes extending from the valve casing to the heating chamber, one pipe can be eliminated and the heating chamber can be provided with an opening extending to the atmosphere so that the exhaust gases will pass direct from the exhaust line pipe through the heating chamber to the atmosphere without returning to the exhaust line pipe as herein shown.

Extending transversely through the valve casing 4 is a valve stem 19 carrying a valve 20 of the butterfly type, the portions of the valve to each side of the stem being equal in size in order to balance the valve, as by constructing a valve of this type mounted on a stem as shown, the valve is balanced so as to overcome the vibrations caused by the pulsations of the exhaust.

In this embodiment of valve the valve stem is arranged above the upper lead or outlet 17, and the lower end of the valve is adapted to contact with the portion 21 between the inlets and outlets 17 and 18 so that when in the position hereinshown, the exhaust gases from the exhaust manifold 3 will be carried through the outlet pipe 17 to cause the same to circulate through the heat jacket and back through the pipe 18 into the valve casing on the opposite side of the valve and out through the exhaust line pipe. When the valve is shifted into vertical position, a free passage for the exhaust gases is provided and the same pressure on the inlets and outlets 6 and 7 is obtained whereby very little, if any, exhaust gases passes into the heating chamber surrounding the carbureting passage.

While we have shown this particular construction of valve, we do not wish to limit ourselves to the use of the same as we are aware that a valve having a stem mounted at the point 21 within the valve casing can be used so as to swing upwardly and when in closed position, will close the passage through the valve casing so as to cause the gases to pass through the heating chamber, and when swung into vertical position, will close the outlet of the valve casing in order to prevent the gases from passing to the heating chamber.

We are also aware that a valve having a stem can be mounted centrally within the valve casing in substantially horizontal alignment with the portion 21 of the valve casing so as to control the passage of exhaust gases to the heating chamber surrounding the carbureting passage.

A valve casing having a sliding valve mounted to move across the valve casing in order to prevent the passage of exhaust gases therethrough can be used and we are aware that other forms of valves not hereindescribed can be used for diverting the exhaust gases from their natural path of travel to the heating jacket surrounding the manifold and therefore we do not wish to limit ourselves to any detail of construction of valve for accomplishing this result.

An opening 22 is formed in the intake manifold 2 in which is arranged a casing in the form of a cup 23 having a removable cover 24 adapted to be secured in position by screws 25, said cup being provided with a tubular nipple 26 forming a bearing for the stem 27 of a thermostat 28 which is preferably of the bellows type, but of course we do not wish to limit ourselves to the use of any particular construction of thermostat as various makes of well known thermostats now in use can be employed but by arranging the thermostat within a casing disposed in the intake manifold we prevent any leakage and arrange the same in the path of the explosive charge in such a manner that as the temperature of the charge increases or decreases the thermostat expands and contracts in the ordinary manner so as to control the position of the valve within the exhaust line as will be hereinafter fully described.

Extending out from the cover 24 is a bearing 29 in which is mounted a vertical shaft 30 having the hub 31 of a bifurcated arm 32 fixed to the upper end thereof, said bifurcated arm extending into an annular groove 33 formed in the end of the stem 27 of the thermostat in order to form a loose connection between the arm and thermostat whereby the shaft 30 will be rocked in its bearing as the thermostat expands and contracts.

Fixed to the lower end of the shaft 30 is an arm 34 having an apertured end 35 in which the hooked end of a connecting rod 36 is pivotally mounted as shown in Figure 1, the other end of said rod being mounted in one of the apertures 37 of arm 38 fixed to the valve stem 19 as shown in Figure 1 in order to form an adjustable operative connection between the valve stem and thermostat whereby the valve will be rocked or swung as the thermostat expands and contracts and while we have shown this particular construction of connecting the same, we are aware that various changes can be made without departing from the spirit of our invention.

From the foregoing description it will be seen that we have provided a thermostatic heat control for charge forming devices wherein a thermostat is disposed in the path of travel of the charge in its passage to the internal combustion engine and is connected to a valve arranged in the exhaust line pipe so as to control the passage of the exhaust gases to a heating jacket surrounding the induction passage whereby we are able to regulate automatically the temperature of the charge delivered to the internal combustion engine.

While we have shown certain details of construction in the embodiment of our invention for an internal combustion engine, we do not wish to limit ourselves to these details of construction as our invention consists broadly in arranging a thermostat in the path of travel of the exhaust gases to the engine and having a heating jacket surrounding the carbureting passage or a portion of the intake manifold which is equivalent to a portion of the carbureting passage, which heating jacket is in communication with the exhaust line pipe, the passage of exhaust gases to said heating jacket being controlled by a valve which is actuated by the thermostat.

The operation of the thermostatic heat control as hereinshown is as follows. The parts being in the position shown and assuming that the engine is idle, when the engine is started, the exhaust gases from the exhaust manifold pass through the heating chamber surrounding the carbureting passage so as to heat the charge and as the thermostat is arranged in the path of travel of this charge and in such a position that it will be affected by the heat from the charge and as the engine warms up, the thermostat expands and through its connection with the valve gradually opens the same so as to control the passage of exhaust gases to the heating chamber and when the engine has been heated to a predetermined temperature through the thermostat, the valve in the exhaust line will be swung into vertical or full open position so as to allow the entire volume of gases from the exhaust manifold to pass out through the exhaust line pipe.

What we claim is:

An internal combustion engine having an exhaust pipe, intake manifold and charge forming device connected thereto, a heater arranged to heat the charge in its passage from the charge forming device to the engine, a cup disposed in the induction pipe, a cover for closing said cup having a tubular nipple, a valve disposed in the exhaust pipe, a thermostat disposed in said cup having a stem working in said tubular nipple, a bearing formed on the cover of said cup, a vertical shaft mounted in said bearing, a bifurcated arm fixed on said shaft having a connection with the stem of said thermostat and an adjustable connection between said shaft and said valve for regulating the temperature of the charge delivered to the internal combustion engine.

In testimony whereof we have hereunto affixed our signatures.

WALTER G. HEGINBOTTOM.
JACOB RICHARD FRANCIS.